(12) United States Patent
Stephenson

(10) Patent No.: US 6,253,847 B1
(45) Date of Patent: Jul. 3, 2001

(54) DOWNHOLE POWER GENERATION

(75) Inventor: Kenneth E. Stephenson, Newtown, CT (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 09/368,748

(22) Filed: Aug. 5, 1999

(30) Foreign Application Priority Data

Aug. 13, 1998 (GB) .................................................. 9817544

(51) Int. Cl.$^7$ .............................. E21B 43/00; C25F 7/00
(52) U.S. Cl. ........................ 166/248; 166/65.1; 204/421
(58) Field of Search ............................... 166/241.1, 65.1, 166/248; 204/196.04, 194, 421

(56) References Cited

U.S. PATENT DOCUMENTS

| | | |
|---|---|---|
| 3,876,471 | 4/1975 | Jones . |
| 4,060,988 * | 12/1977 | Arnold .................................. 166/268 |
| 5,099,918 * | 3/1992 | Bridges et al. .......................... 166/60 |
| 5,656,140 * | 8/1997 | Oesterle et al. ...................... 204/234 |
| 5,839,508 * | 11/1998 | Tubel et al. .......................... 166/65.1 |

OTHER PUBLICATIONS

Galletti, R., Citi, G., and Battaia, C. Sea Water Batteries Application to the Luna 27 Autonomous Well Society of Petrolium Engeineers 36940, European Petroleum Conference, Oct. 22–24, 1996, Milan, Italy, pp. 591–597.

* cited by examiner

Primary Examiner—Frank Tsay
(74) Attorney, Agent, or Firm—William L. Wang; William B. Batzer

(57) ABSTRACT

There is provided downhole power generation apparatus with a first electrode, a second electrode and an electrolyte, wherein the first electrode comprises a casing within a borehole. The first electrode and the second electrode are formed from dissimilar metals and by appropriate selection of the two dissimilar metals, the casing functions as the cathode. Typically the first electrode is formed from a steel casing and the second electrode is of zinc. The second electrode is provided on an insulated connector joining at least two sections of casing. Power is extracted in an electrical load connected between the casing and the second electrode. Where a cement holds the casing in place within the borehole, it serves as the electrolyte. The cement is provided with additives to improve its conductivity. The first electrode is provided with oxide coatings, such as iron (III) oxide, to mediate the electrolytic reaction at the cathode. A method of generating electrical power down a borehole is also provided, the method comprising positioning at least one hollow cylinder made from a first material within a borehole, placing a dissimilar second material within the borehole, the first and second materials both communicating with a common electrolytic medium, thereby to form an electrolytic cell, and connecting an electrical load to the first and second materials to complete an electrical circuit and allow a current to flow through the load.

15 Claims, 2 Drawing Sheets

DOWNHOLE POWER GENERATION

This invention concerns downhole power generation within a borehole and relates to downhole power generation apparatus for use within the borehole and also to an associated method of generating power downhole.

BACKGROUND OF THE INVENTION

For downhole power generation, various methods of transmitting power from the surface to devices within the borehole have been proposed, such as placing cables in an annulus formed between the borehole and casing placed within the borehole, or use of electrical conduction through the casing. The use of sea water batteries, being isolated cells which are placed on the sea floor to provide local power generation for sub-sea production systems, is also known. However the use of batteries within boreholes is a problem as there is only space for small batteries within boreholes, and these batteries have a current generating lifetime of only a few days, due to the high temperatures downhole.

It is one aim of the present invention to provide downhole power generation method and apparatus with an extended life time for generating electricity.

SUMMARY OF THE INVENTION

According to one aspect of the invention, there is provided downhole power generation apparatus comprising a first electrode, a second electrode and an electrolyte, wherein the first electrode comprises a casing within a borehole. The use of a metal casing, such as that cemented into place within a borehole to provide zonal isolation, is of advantage as in this way the usually detrimental process of corrosion of the casing which occurs naturally within a borehole can be utilized to generate electrical power in situ.

Preferably the first electrode is a cathode and the second electrode is the anode. This is of advantage as very little material forming the casing will be removed as a result of current flow and as current flow is typically limited by the reaction of oxygen at a cathode, the large area of the casing will ensure that a large current flow is achieved.

Preferably the first electrode and the second electrode are formed from dissimilar metals and by appropriate selection of the two dissimilar metals, the casing will function as the cathode electrode. Thus typically the first electrode is formed from a steel casing and the second electrode is of zinc. The first and second electrodes may also be provided by metal alloys.

Desirably the second electrode is provided on an insulated connector joining at least two sections of casing. For such a second electrode, power is extracted in an electrical load connected between the casing and the second electrode.

However as an alternative the second electrode may be provided by a sacrificial electrode placed at the bottom of the borehole and in electrical communication via a load to the first electrode.

The electrolyte may be provided in a variety of ways as long as sufficient oxygen is available for use in the electrolytic reaction at the electrodes. Therefore one preferred electrolyte is flowing water produced by a well. Oxygen concentrations as low as 1 ppm are sufficient to allow the water to function as the electrolyte.

Alternatively where a cement holds the casing in place within the borehole, it may serve as the electrolyte. To this end, the cement may be provided with additives, such as NaCl, to improve its conductivity.

The electrodes may be provided with coatings of compounds to mediate the electrolytic reactions occurring. Thus preferably the first electrode is provided with oxide coatings to mediate electrolytic reaction at the cathode. A desirable coating is iron (III) oxide, with oxygen for the cathode reaction being provided by the reduction of iron (III) oxide to iron (II) oxide. The iron (III) oxide is preferably incorporated into the first electrode by pre-rusting the first electrode before it is inserted downhole.

In accordance with another aspect of the invention, a method of generating electrical power down a borehole comprises positioning at least one hollow cylinder made from a first material within a borehole, placing a dissimilar second material within the borehole, the first and second materials both communicating with a common electrolytic medium, thereby to form an electrolytic cell, and connecting an electrical load to the first and second materials to complete an electrical circuit and allow a current to flow through the load.

Preferably the method also comprises placing a plurality of hollow cylinders made from the first material within a borehole, and connecting successive hollow cylinders via an insulated connector bearing the dissimilar second material.

The method may also further comprise providing an electrical load on the insulated connector, electrical communication between the first and second materials being via the load.

According to a further aspect of the invention, a system for generating an electrical current for powering an electrical device down a borehole comprises first and second electrodes of dissimilar materials located in proximity downhole, but electrically separated, an electrolytic first medium in the vicinity of the electrodes, to form with the electrodes an electrolytic cell, and conductor means to conduct electric current from one electrode via an electrical device, to the other electrode.

These and other features of the invention, preferred embodiments and variants thereof, possible applications and advantages will become appreciated and understood by those skilled in the art from the detailed description and drawings following below.

DRAWING

DETAILED DESCRIPTION

Figure 1:
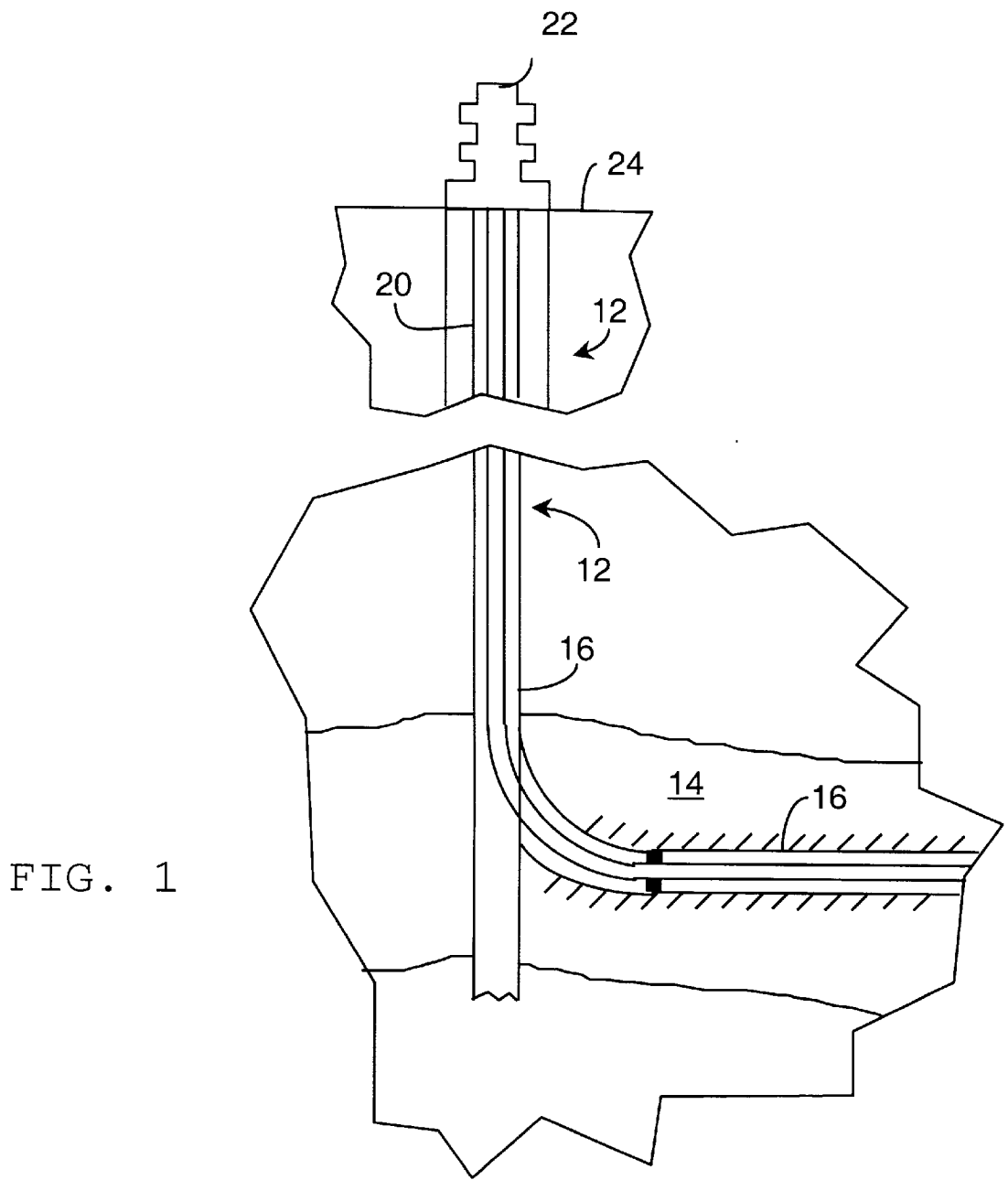
FIG. 1 shows a schematic view of a borehole including downhole power generation apparatus according to the present invention.

FIG. 1 shows a schematic diagram of a completion system using the invention. A borehole 12 is drilled to reach a particular stratum 14 which typically bears oil, although water or gas may be contained within the stratum 14. An hollow cylindrical metal casing 16, typically with an outer diameter of around 18 cm (7 inches), is cemented in place in the borehole 12 to achieve zonal isolation so that any substances contained in other strata are not drawn up through the centre of the borehole during the extraction process. Production tubing 20 is shown within the borehole and this is connected to production apparatus 22 on the surface 24.

Figure 2:
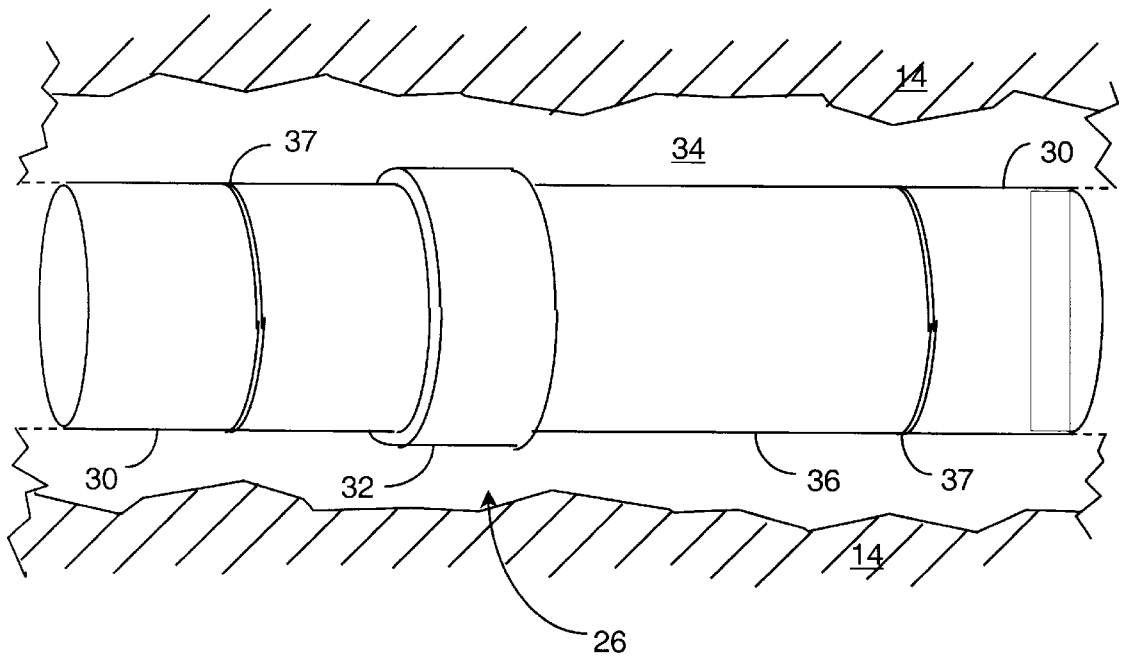
FIG. 2 shows a detailed view of the elements comprising the power generation apparatus.

A detailed view of part of the borehole 12 is shown in FIG. 2, showing elements of an electrochemical cell 26 used in power generation downhole. The electrochemical cell 26 comprises two electrodes and an electrolyte 34, with the iron or steel casing providing the first electrode 30, and zinc 32 providing the second electrode placed on an insulated instrument sub 36 which connects two portions of casing at joints 37, and cement holding the casing in position within the borehole 12 providing the electrolyte 34 to allow transfer of ions between the two electrodes 30, 32. The zinc anode 32 and steel cathode 30 are both formed as hollow cylinders, as can be seen in FIG. 3.

The use of the iron or steel casing as one electrode of an electrochemical cell and zinc on the instrument sub 36 as the second electrode provides a remote DC power source downhole as a result of using existing components provided within a borehole. Only minor adaptation to the normal routine for installation of casing is required to provide all the elements of the cell 26 downhole.

Figure 3:
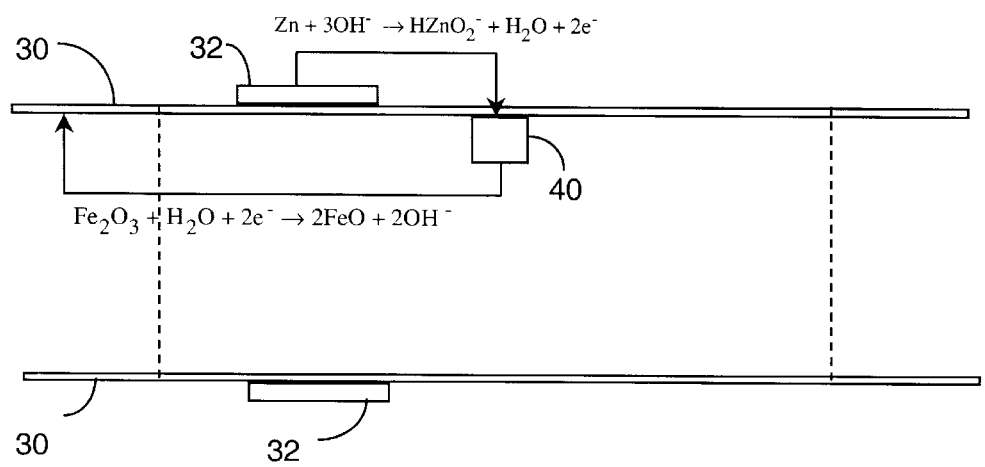
FIG. 3 illustrates the electrolytic process to generate power which occurs within the borehole.

As illustrated by FIG. 3, the different electric potentials associated with the two dissimilar metals of the anode 32 and the cathode 30 allow electrical power to be extracted in a load 40, such as a power converter for converting direct current to alternating current and an associated sensor, connected between the casing 30 and the dissimilar metal 32. By appropriate choice of the dissimilar metal, the iron casing is made to function as a cathode, and this occurs where the second electrode is zinc or magnesium. The use of the casing as the cathode is of advantage as very little iron will be removed from the casing as a result of the current flow, and as the achievable current flow is limited by how much oxygen can react over the cathodic surface, so the large area of the iron casing ensures that oxygen reaction is not unduly limited and that a relatively large current flow is achievable.

Other arrangements of dissimilar metals to provide the second electrode are possible. For example, a large mass of "sacrificial" anode material can be placed at the bottom of the well 12 to function as the second electrode 32, avoiding incorporation of the second electrode 32 into the casing structure. With such a sacrificial material, wires are run between the anode material to electrical loads 40 along the well and then to the iron casing cathode so as to form the necessary electric circuit downhole.

Whilst downhole casing corrodes, and so forms a type of electrochemical cell in that the cathode in this case is surface water and dissolved oxygen in the surface water mediates the cathode reaction, with the steel casing acting as an anode. However, the geometry of this naturally occurring process is unsuitable for supplying power downhole.

For the electrochemical cell 26 provided by the casing 30 and the second electrode 32 to supply an electric current of sufficient order for use in downhole sensors, additional oxygen for mediating the steel cathode reaction is required over and above that associated with the normally occurring corrosion process, where the oxygen is in the surface water supply. Where the well is producing flowing water with an oxygen concentration of at least 1 ppm, there is sufficient oxygen in the produced water for the water itself to function as the electrolyte in the electrochemical cell and for the cathodic reaction to be mediated.

For wells producing only hydrocarbons, the cement 34 between the casing and the formation is used as the electrolyte, as in FIG. 2, and additional oxygen associated with the cathodic reaction is required. Also, the cement 34 must have sufficient permeability and conductivity to move the ions produced at both the cathode and the anode. While the cement may contain some oxygen due to mixing at the surface, the amount will be too small to mediate sufficient electrochemical reaction to provide adequate power for subsurface sensors. Therefore to increase the permeability, conductivity, and oxygen content of the cement, the cement is loaded with an appropriate amounts of additives, such as NaCl and $O_2$, before insertion downhole and these additives raise the conductance of the cement and provide more oxygen for the cathodic reaction. When adding the additives, the concrete integrity needs to be maintained to ensure it will still function downhole to hold the casing in place in the borehole 12.

In addition, or as an alternative, oxygen compounds formed as layers on the casing 30 can be used for mediating the reaction at the cathode. Thus casing which is rusted before insertion downhole provides layers of iron oxide on its surface which can be used as a mediator. Thus the cathode reaction can either be provided by cathodic reduction of water, giving hydrogen, or by reduction of a film of ferric oxide which is pre-formed on the casing before the casing is positioned downhole.

The electrochemical cell operates at significant depths in de-aerated conditions, so for the system shown in FIGS. 1 and 2 using pre-rusted casing and cement, the electrolytic reactions occurring, and as shown in FIG. 3, are for reduction on the casing surface:

$$Fe_2O_3 + H_2O + 2e^- \rightarrow 2FeO + 2OH^- \qquad [1]$$

and for oxidation at the zinc anode:

$$Zn + 3OH^- \rightarrow HZnO_2^- + H_2O + 2e^- \qquad [2]$$

The zinc thus goes into solution, with the iron of the iron(III) oxide merely changing oxidation number.

When using pre-rusted casing downhole, a thick layer of ferric oxide is needed to provide the mediated cathodic reaction for as long as possible. The open-circuit voltage, i.e. the difference between the equilibrium potentials in the absence of all polarisations or parasitic reactions, between a zinc anode and a steel cathode in de-aerated conditions is typically around 0.4V. However for pre-rusted casing using the reduction of Fe(III) as the cathodic process, the open-circuit voltage is around 0.7V. The voltage reduces with passage of current from the cell, the voltage under load depending on the resistance of the system. Polarisations may well reduce individual cell voltages, although higher voltages can be achieved by series connection of devices.

Provision of a higher iron oxide, such as $Fe_2O_3$, only gives the higher voltage as long as the higher oxide exists. Under load, the higher oxide layer is consumed by reduction, and after consumption is no longer available. Whilst the consumption rate depends on the current density drawn, a 1 nm thick film of dense Fe(III) oxide being cathodically reduced to Fe(II) oxide is expected to last about one year if reduced at a rate of 10 $\mu$A cm By making the borehole steel casing 30 the cathode, corrosion resistance of the casing is improved. In the example, Zn functions as a sacrificial anode material in the same manner as common in the protection of marine equipment.

Whilst the use of the zinc anode in combination with a steel cathode provides an open-circuit voltage of about 0.7V, slightly higher voltages may be possible with anodes made from alloys of Magnesium or Lithium. The electric current possible is limited by the properties of the cement, but is of the order of 50 milliamperes which allows powering of downhole sensors, with approximately 35 mWatts of power thus being available. Downhole sensors suitable for use with the electrochemical cell described will be very low power devices, such as capacitance hold-up sensors, and typically the electrochemical cell 26 described is used during production for both sensors and telemetry.

What is claimed is:

1. A downhole electrical power generation apparatus comprising:
   a first electrode comprising at least part of a borehole casing within a borehole;
   a second electrode; and
   a cement used to hold the first electrode in place, the cement comprising an electrolyte in electrical communication with the first and second electrodes.

2. A downhole power generation apparatus according to claim 1, wherein the first electrode is a cathode and the second electrode is an anode.

3. A downhole power generation apparatus according to claim 2, wherein the first electrode and the second electrode are formed from dissimilar metals.

4. A downhole power generation apparatus according to claim 3, wherein the first electrode is formed from a steel casing and the second electrode is of zinc.

5. A downhole power generation apparatus according to claim 1, wherein the second electrode is provided on an insulated connector joining at least two sections of casing.

6. A downhole power generation apparatus according to claim 1, wherein the second electrode is provided by a sacrificial electrode placed at the bottom of the borehole and in electrical communication via an electrical load to the first electrode.

7. A downhole power generation apparatus according to claim 1, wherein the cement is provided with additives to improve its conductivity.

8. A downhole power generation apparatus according to claim 1, wherein the electrodes are provided with coatings of compounds to mediate the electrolytic reactions.

9. A downhole power generation apparatus according to claim 8, wherein the first electrode is provided with oxide coatings to mediate the electrolytic reaction at the cathode.

10. A downhole power generation apparatus according to claim 9, wherein the coating is iron (III) oxide.

11. A downhole power generation apparatus according to claim 1, wherein iron (III) oxide is incorporated into the first electrode by pre-rusting the first electrode before it is inserted downhole.

12. A method of downhole electrical power generation comprising the steps of:
    positioning in place within a borehole with a cement at least part of a borehole casing made from a first material the cement comprising an electrolytic medium;
    placing a dissimilar second material within the borehole, the first and second material both communicating with the electrolytic medium, thereby to form an electrolyte cell; and
    connecting an electrical load to the first and second materials to complete an electrical circuit and allow a current to flow through the load.

13. A method according to claim 12, further comprising placing a plurality of parts of the borehole casing made from the first material within a borehole, and connecting successive parts of the borehole casing via an insulated connector bearing the dissimilar second material.

14. A method according to claim 13, further comprising providing an electrical load on the insulated connector, electrical communication between the first and second material being via the load.

15. An apparatus for downhole electrical power generation comprising:
    first and second electrodes of dissimilar materials located in proximity downhole, but electrically separated, the first electrode comprising at least a part of a borehole casing held in place within a borehole;
    a cement used to hold the at least part of the borehole casing in place, the cement comprising an electrolytic medium in the vicinity of the electrodes, to form with the electrodes an electrolytic cell; and
    a conductor adapted to conduct electric current from one electrode via an electrical device, to the other electrode.

* * * * *